(12) United States Patent
Tate et al.

(10) Patent No.: US 8,608,515 B2
(45) Date of Patent: Dec. 17, 2013

(54) DEVICE CONNECTOR

(75) Inventors: Takuya Tate, Yokkaichi (JP); Hiroyuki Matsuoka, Yokkaichi (JP)

(73) Assignee: Sumitomo Wiring System, Ltd. (JP)

( * ) Notice: Subject to any disclaimer, the term of this patent is extended or adjusted under 35 U.S.C. 154(b) by 0 days.

(21) Appl. No.: 13/413,084

(22) Filed: Mar. 6, 2012

(65) Prior Publication Data

US 2012/0238149 A1  Sep. 20, 2012

(30) Foreign Application Priority Data

Mar. 15, 2011 (JP) .................................. 2011-056337

(51) Int. Cl.
*H01R 13/502* (2006.01)

(52) U.S. Cl.
USPC ........... 439/686; 439/599; 439/606; 439/695; 439/936; 439/937

(58) Field of Classification Search
USPC ......... 439/606, 736, 604, 937, 936, 599, 686, 439/695
See application file for complete search history.

(56) References Cited

U.S. PATENT DOCUMENTS

| | | | |
|---|---|---|---|
| 4,597,627 A * | 7/1986 | Wondra et al. | 439/174 |
| 4,781,615 A * | 11/1988 | Davis et al. | 439/395 |
| 4,917,629 A * | 4/1990 | Matsuzaki et al. | 439/405 |
| 5,030,138 A * | 7/1991 | Capp et al. | 439/497 |
| 5,108,317 A * | 4/1992 | Beinhaur et al. | 439/736 |
| 5,761,805 A * | 6/1998 | Guyer | 29/883 |
| 6,059,613 A * | 5/2000 | Feher et al. | 439/713 |
| 6,076,258 A | 6/2000 | Abe | |
| 6,790,086 B1 * | 9/2004 | Lo | 439/599 |
| 6,823,587 B2 * | 11/2004 | Reed | 29/858 |
| 7,572,150 B2 | 8/2009 | Matsuoka | |
| 8,342,880 B2 * | 1/2013 | Kato et al. | 439/595 |
| 2004/0171310 A1 * | 9/2004 | Harper et al. | 439/686 |
| 2005/0227036 A1 | 10/2005 | Takanashi | |
| 2009/0029594 A1 * | 1/2009 | Matsuoka | 439/626 |
| 2010/0297864 A1 * | 11/2010 | Matsuoka | 439/271 |
| 2011/0187213 A1 * | 8/2011 | Kitagawa et al. | 310/71 |
| 2012/0238134 A1 * | 9/2012 | Matsuoka et al. | 439/587 |
| 2012/0238138 A1 * | 9/2012 | Matsuoka et al. | 439/607.55 |
| 2012/0238143 A1 * | 9/2012 | Matsuoka et al. | 439/626 |
| 2012/0238149 A1 * | 9/2012 | Tate et al. | 439/660 |
| 2012/0238150 A1 * | 9/2012 | Sakamoto et al. | 439/660 |

FOREIGN PATENT DOCUMENTS

GB  2233596  1/1991

* cited by examiner

*Primary Examiner* — James Harvey
(74) *Attorney, Agent, or Firm* — Gerald E. Hespos; Michael J. Porco; Matthew T. Hespos

(57) ABSTRACT

A terminal block in which a plurality of conductive plates (10) connected to device-side busbars provided in a motor are made integral by a connector housing (50) made of synthetic resin includes a plurality of cores (65) in which the conductive plates (10) are made integral to a primary molded portion (61); a metal plate (30) to be attached and fixed to a motor case; and a secondary molded portion (70) integrally forming the plurality of cores (65) held in contact side by side and the metal plate (30). A contact portion (66) is provided between a pair of adjacent cores (65, 65) and the pair of adjacent cores (65, 65) are held in contact via the contact portion (66).

7 Claims, 17 Drawing Sheets

DEVICE CONNECTOR

BACKGROUND OF THE INVENTION

1. Field of the Invention

The invention relates to a device connector.

2. Description of the Related Art

U.S. Pat. No. 7,572,150 discloses a device connector to be connected to a device, such as a motor installed in an electric vehicle or a hybrid vehicle. This device connector includes metal busbars for connecting device-side terminals in the device and wire-side terminals on power feeding wires. The device connector also has a molded resin portion covering the busbars.

Insert molding is performed with the busbars bent into complicated shapes and arranged side by side in the above device connector. Thus, a demolding structure for the molded resin becomes complicated and suitable boring cannot be performed on the molded resin. Voids (small clearances) may be produced in a thick part of the molded resin and may cause cracks that can reduce the waterproof property of the device connector. To suppress the formation of voids in the molded resin, thought has been given to forming a primary molded article by primary molding to cover parts of the respective busbars by a primary molded synthetic resin portion, setting the primary molded article in a secondary molding die and covering the primary molded portion by a secondary molded portion. However, when the cores are set in the secondary molding die and molding resin is injected into the secondary molding die, the cores rotate about the axis lines of the busbars due to the influence of an injection pressure of the molding resin and the secondary molded portion may be formed with the cores displaced.

The invention was completed in view of the above situation and an object thereof is to improve production of a device connector.

SUMMARY OF THE INVENTION

The invention relates to a device connector with metal conductors to be connected to device-side terminals in a device. The device connector also has a molded resin portion made of synthetic resin and comprising a plurality of cores with the conductors a primary molded portion formed integrally around the conductors. The device connector also has a metal plate to be attached and fixed to the device. A secondary molded portion is formed integrally around the metal plate and the cores that are held in contact substantially side by side. A contact portion is provided between a pair of adjacent cores and the adjacent cores are held in contact via the contact portion in two or more directions including an injection direction of molding resin.

The primary molded portion and the secondary molded portion are formed in separate steps, and hence there are no thick portions that are prone to formation of voids. Further, the primary molded portion is divided, thereby further suppressing the formation of voids. The contact portions of the adjacent cores come into contact in at least two directions, thereby suppressing displacements of the cores due to rotation or the like. In this way, the secondary molded portion can be formed with the respective conductors at proper positions.

Parts of the contact portion that contact each other may be formed by a first intersecting surface intersecting the injection direction and a second intersecting surface extending in the injection direction. The first intersecting surfaces of the adjacent cores may come into surface contact with each other and the second intersecting surfaces thereof also may come into surface contact with each other when the molding resin for forming the secondary molded portion is injected into a secondary molding die. According to this construction, displacements of the cores resulting from an injection pressure of the molding resin can be suppressed merely by bringing the first intersecting surfaces into surface contact with each other and the second intersecting surfaces into surface contact with each other without providing any contact portion having a complicated structure.

The parts of the contact portion that come into contact with each other may be each formed into a cranked shape by connecting the first intersecting surface and the second intersecting surface. According to this construction, in setting the respective cores in the secondary molding die, the respective cores can be set without the parts of the contact portion being engaged with each other through mating engagement, and a process of assembling the cores can be simplified. Further, a primary molding die for forming the primary molded portion can be simplified and production cost of the primary molding die can be reduced.

A resin entering space may be formed between adjacent cores and the molding resin for forming the secondary molded portion can enter rein entering space.

A straight part extending in an arrangement direction of the cores is formed on the primary molded portion when the cores are set in contact without any clearances in the die for forming the secondary molded portion. Thus, the length of the secondary molded portion covering the straight part of the primary molded portion increases, and the amount of shrinkage thereof also increases. When the secondary molding resin is cooled and solidified, the primary molded portion may be squashed by the shrinkage of the secondary molded portion. However, the straight part of the primary molded portion in accordance with the invention is divided into a plurality of parts by the resin entering space. Therefore the lengths of parts of the secondary molded portion individually covering the respective straight parts of the primary molded portion can be made shorter.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
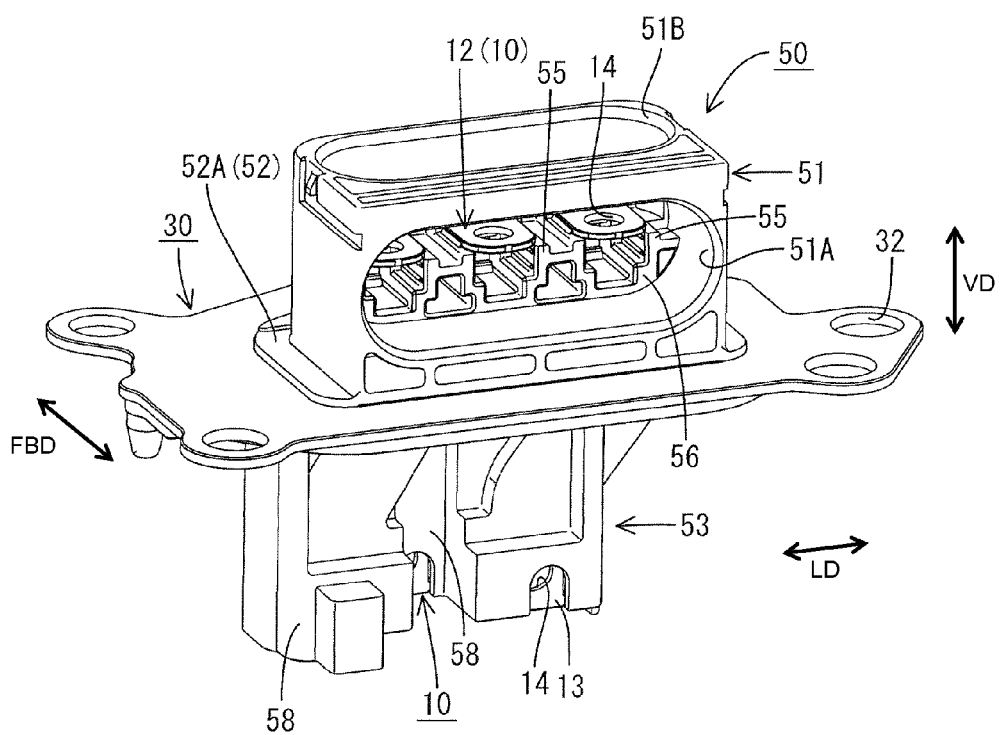
FIG. 1 is a perspective view of a terminal block according to an embodiment.

A device connector in accordance with the invention is a terminal block that is to be attached to a metal motor case (not shown) that houses a motor, or other such device. As shown in FIG. 1, the terminal block includes a metal plate 30 to be attached and fixed to the motor case, a molded resin housing 50 molded to be integral to the metal plate 30, and three conductive plates 10 held in the housing 50 while penetrating through the metal plate 30 in a plate thickness direction TD.

First ends of the conductive plates 10 are to be bolt-fastened to unillustrated device-side busbars at the motor case for electrical connection. On the other hand, in an inverter or other such power supply device for supplying power such as an inverter, wires are arranged to extend toward the motor case and an unillustrated wire-side connector is provided at ends of the wires. Wire-side terminals connected to respective wire ends are provided in the wire-side connector and are bolt-fastened to the second ends of the respective conductive plates 10 for electrical connection. Note that, in the following description, a vertical direction VD is a vertical direction in FIG. 2 and a lateral direction LD is a lateral direction in FIG. 2.

Figure 7:
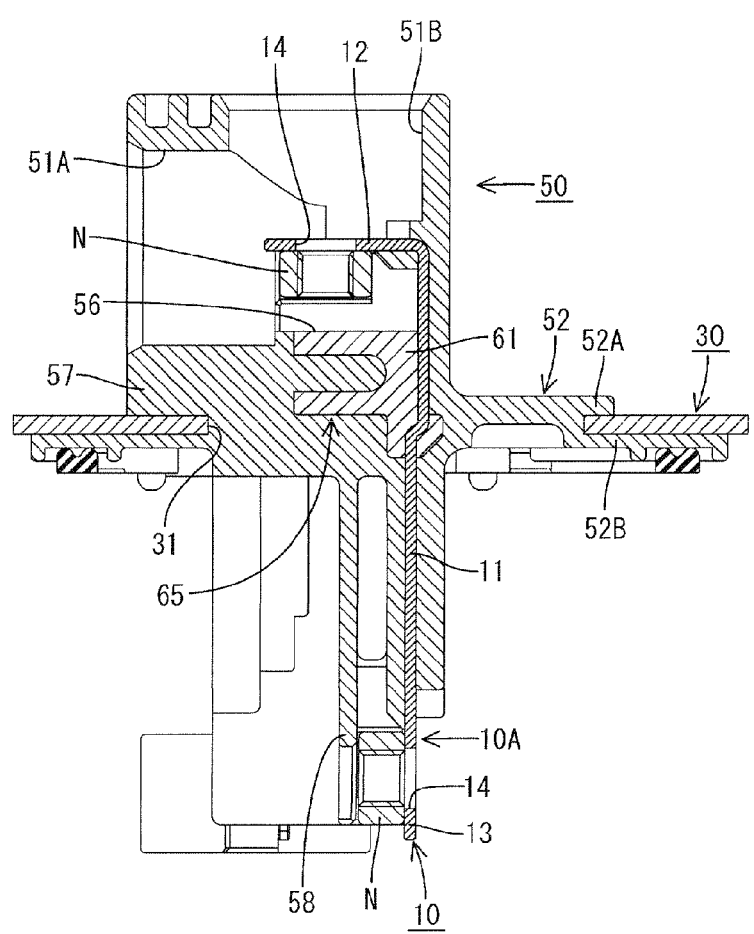
FIG. 7 is a section along VII-VII of FIG. 2.

Each conductive plate 10 is formed from a conductive metal plate with good electrical conductivity. The metal plate is punched or cut into a specified shape by a press, and then is subjected to a specified bending process. As shown in FIG. 7, the conductive plate 10 includes a terminal main portion 11, a wire-side fastening portion 12 extending forward from the upper end of the terminal main portion 11, and a device-side fastening portion 13 at a lower end of the terminal main portion 11. The terminal main portion 11 is formed longer than the wire-side fastening portion 12.

Figure 2:
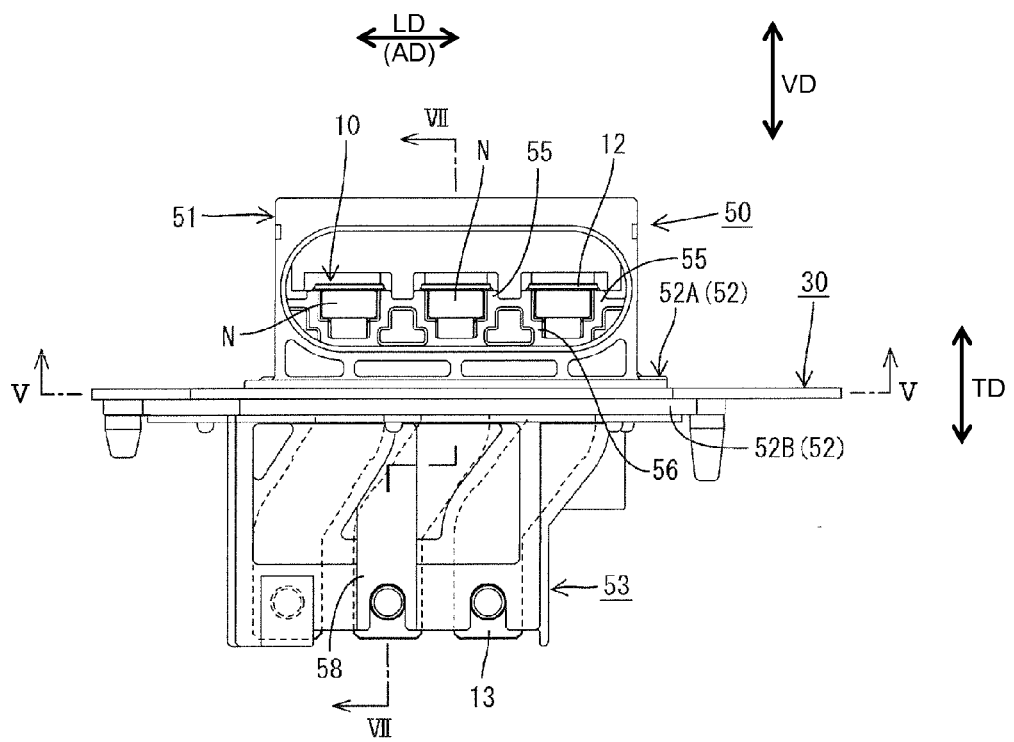
FIG. 2 is a front view of the terminal block according to the embodiment.

As shown in FIG. 2, three conductive plates 10 are arranged substantially side by side in the lateral direction LD. Further, the terminal main portions 11 are cranked slightly in the lateral direction LD at intermediate positions. Each wire-side fastening portion 12 and each device-side fastening portion 13 has a bolt insertion hole 14 through which a fastening bolt (not shown) is insertable.

Figure 11:
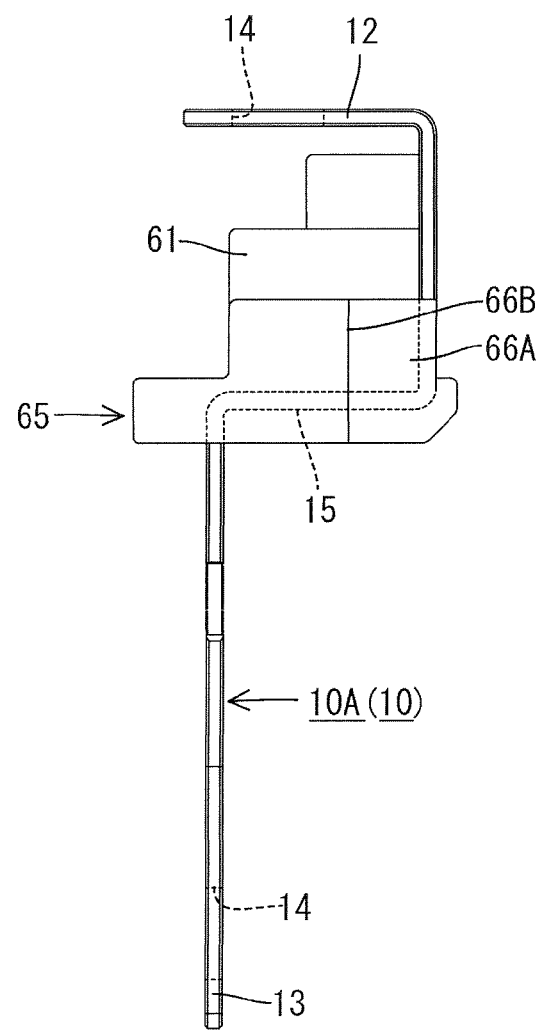
FIG. 11 is a side view of the left core.

The terminal main portion 11 of the conductive plate 10A in the center position extends substantially in the vertical direction VD and is substantially flat as shown in FIG. 7. As shown in FIG. 11, the lateral terminal main portions 11, 11 of the conductive plates 10B, 10B at the opposite left and right sides each has a folded portion 15 bent forward to face the wire-side fastening portion 12 at a substantially vertically central part of the terminal main portion 11 and the front end of the folded portion 15 is bent down at substantially the same position as the front end of the wire-side fastening portion 12.

The metal plate 30 is flat and an opening 31 penetrates through the metal plate 30 in a plate thickness direction TD of the plate material. The housing 50 includes a wire-side fitting 51, a plate-like flange 52 and a device-side fitting 53. The wire-side fitting 51 vertically penetrates through the opening 31 and is molded to be integral to the metal plate 30 at a position above the metal plate 30. The flange 52 bulges out laterally at the height position of the metal plate 30. The device-side fitting 53 is below the metal plate 30.

The wire-side fitting 51 is a wide box with a front opening 51A and an upper opening 51B, as shown in FIG. 1. The wire-side connector can fit into the front opening 51A of the wire-side fitting 51.

As shown in FIG. 2, three nut accommodating portions 55 are formed substantially side by side in the lateral direction LD in the wire-side fitting portion 51. Each nut accommodating portion 55 is open forward and up. More particularly, each nut accommodating portion 55 faces forward through the front opening 51A and up through the upper opening 51B. Nuts N are press-fit through the front end opening 51A from the front and are accommodated in the nut accommodating portions 55 so that the axis lines of the nuts N are aligned with the vertical direction VD.

Figure 3:
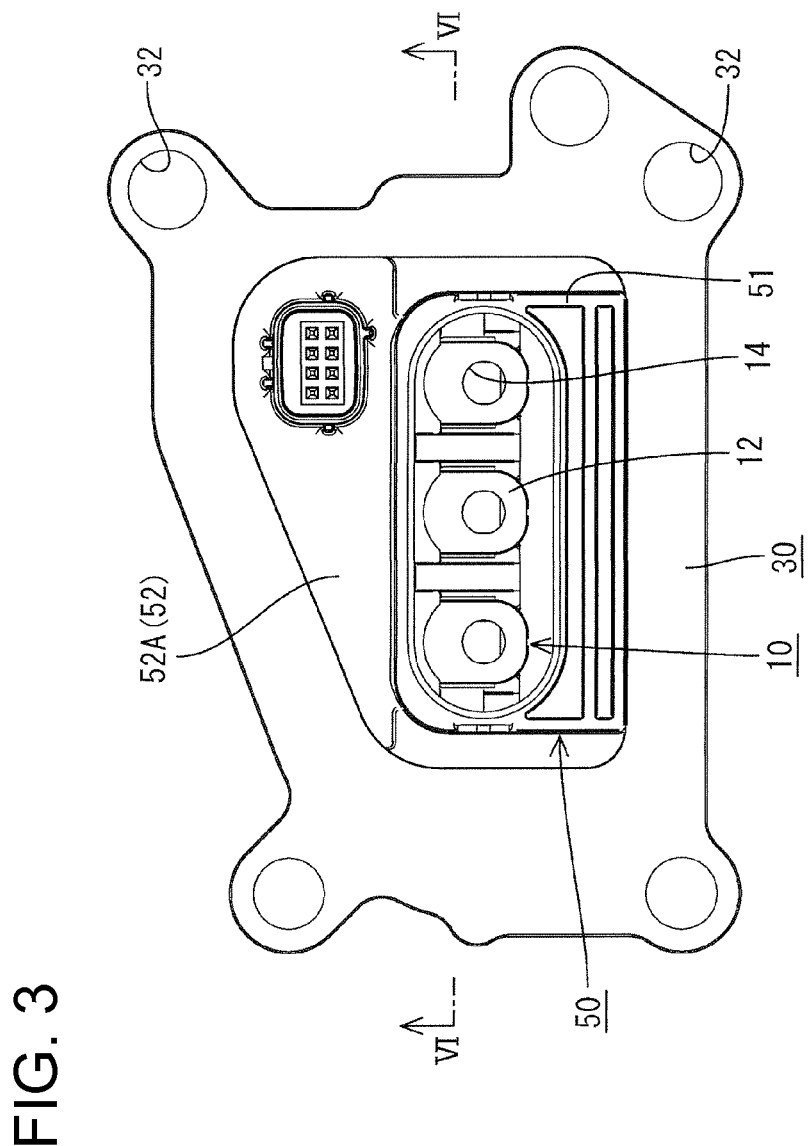
FIG. 3 is a plan view of the terminal block according to the embodiment.
Figure 4:
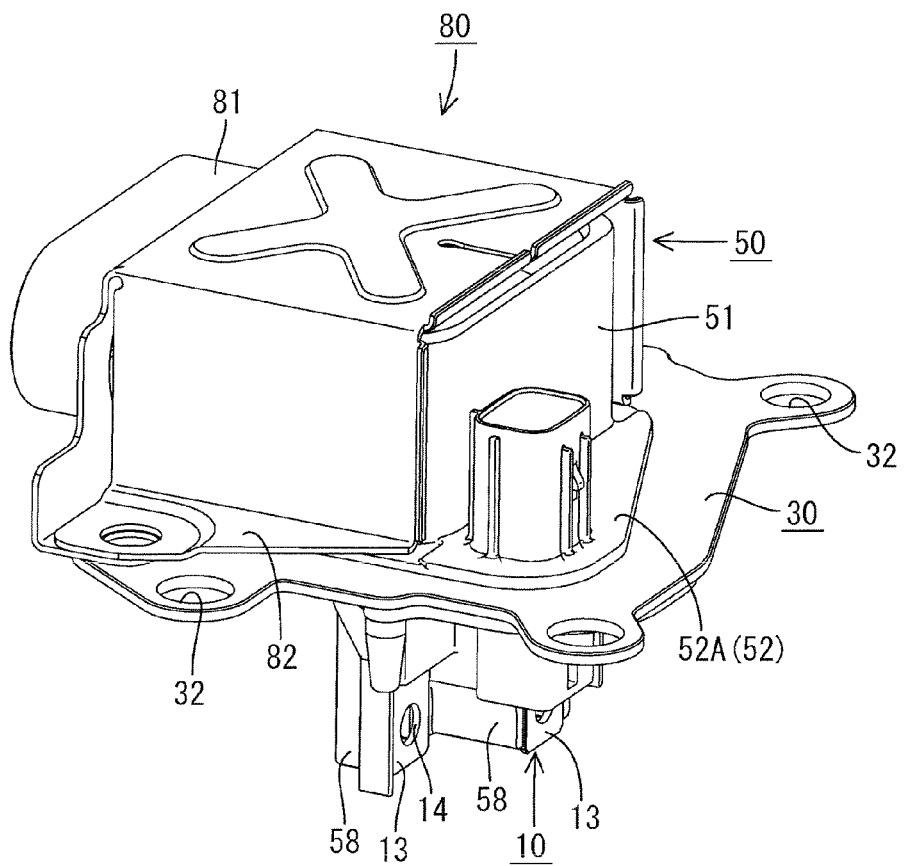
FIG. 4 is a perspective view showing a state where a shielding shell is mounted on the terminal block according to the embodiment.
Figure 6:
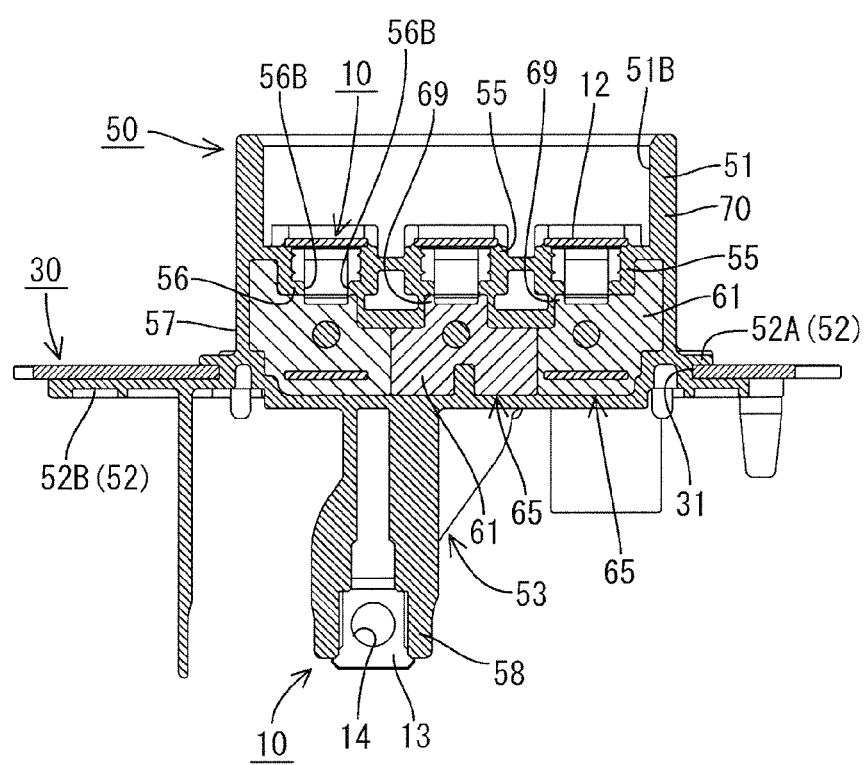
FIG. 6 is a section along VI-VI of FIG. 3.

The wire-side fastening portions 12 of the conductive plates 10 are arranged to close the upper end openings of the nut accommodating portions 55 as shown in FIGS. 3 and 4. Further, as shown in FIG. 6, each conductive plate 10 is arranged to penetrate through the opening 31 in the vertical direction VD and is held in the housing 50 so that the wire-side fastening portion 12 is arranged around the bolt insertion hole 14 and is exposed forward and up in the wire-side fitting 51. On the other hand, the device-side fastening portion 13 is arranged around the bolt insertion hole 14 and is exposed backward at the lower end of the device-side fitting 53. Each wire-side fastening portion 12 is exposed to the outside through the upper end opening 51B of the wire-side fitting 51. That is, the upper end opening 51B of the wire-side fitting 51 may be used as a service hole for insert a tool or the like for a bolt fastening operation. The wire-side terminal is placed on the wire-side fastening portion 12 and the tool is inserted inside through the upper end opening 51B to threadedly engage the fastening bolt with the nut N, so that the conductive plate 10 and the wire-side terminal are connected electrically. Note that a service cover (not shown) is mounted on or to the upper end opening 51B of the wire-side fitting portion 51 after bolt fastening, thereby closing the upper end opening 51B.

An escaping recess 56 is provided below each nut accommodating portion 55 for allowing a leading end part of the fastening bolt penetrating through the nut N to escape when the fastening bolt is fastened to the nut N. The escaping recess 56 is narrower than the nut accommodating portion 55 in the lateral direction LD and is formed unitarily with the nut accommodating portion 55 by a slide die 92 to be described later.

As shown in FIG. 4, a metal shielding shell 80 is mounted on the wire-side fitting 51 and at least partly covers the wire-side fitting 51 except the rear surface. The shielding shell 80 is formed by using a press to punch or cut a metal plate with good electrical conductivity and then performing a specified bending process on the punched or cut conductive plate. The shielding shell 80 includes a wide tubular fixing portion 81 and a braided wire can be crimped to the tubular fixing portion 81 by a crimp ring to collectively cover shielded conductive paths of the wire-side connector. The shielding shell 80 also has a fixing piece 82 for fixing the shielding shell 80 to the metal plate 30 and electrically connecting the shielding shell 80 and the metal plate 30.

The flange 52 is molded to be integral to the metal plate 30 in a range not reaching an outer peripheral edge of the metal plate 30. Thus, the outer peripheral edge of the metal plate 30 is exposed. More particularly, the flange 52 includes a wire-side flange 52A and a device side flange 52B. The wire-side flange 52A is at a side of the wire-side fitting 51 and extends in the lateral direction LD and backward. The device-side flange 52B is at a side of the device-side fitting 53 and covers a surface of the metal plate 30 at the side of the device-side fitting 53.

Figure 5:
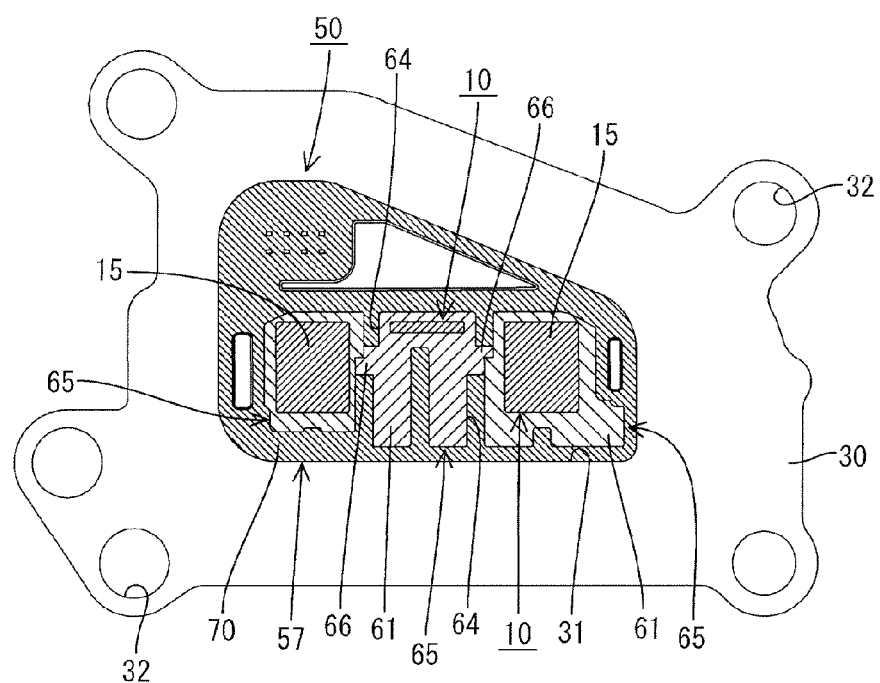
FIG. 5 is a section along V-V of FIG. 2.

The opening 31 has a substantially trapezoidal shape as shown in FIG. 4. Further, the folded portions 15 of the conductive plates 10 at the left and right sides and the terminal main portion 11 of the central conductive plate 10 are arranged in the opening 31. On the other hand, a thick portion 57 having a thick resin layer is formed from a lower part of the wire-side fitting 51 to an upper part of the device-side fitting portion 53, as shown in FIGS. 5 to 7. That is, the three conductive plates 10 having a complicated shape penetrate through the opening 31 of the metal plate 30 in this thick portion 57.

Mounting holes 32 are formed near the outer periphery of the metal plate 30. Unillustrated fixing bolts or rivets are inserted through these mounting holes 32 and fastened to the motor case so that the terminal block can be fixed to the motor case.

The device-side fitting 53 is housed in the motor case when the terminal block is fixed to the motor case. Further, as shown in FIG. 1, three nut accommodating portions 58 are formed in the device-side fitting 53. Specifically, the nut accommodating portion 58 in the center position is arranged behind the other nut accommodating portions 58. The fastening bolts are engaged threadedly with respective nuts N in the nut accommodating portions 58 of the device-side fitting 53 for electrically connecting the conductive plates 10 and the device-side busbars similar to the nut accommodating portions 55 of the wire-side fitting 51. In this way, the wire-side terminals and the device-side busbars are connected electrically using the conductive plates 10 as intermediate terminals.

The housing 50 comprises a primary molded portion 61 made e.g. of synthetic resin and molded to be integral to the conductive plates 10 by primary molding and a secondary molded portion 70 made e.g. of synthetic resin and molded to be integral to the primary molded portion 61 by secondary molding, and formed in two separate processes.

Figure 8:
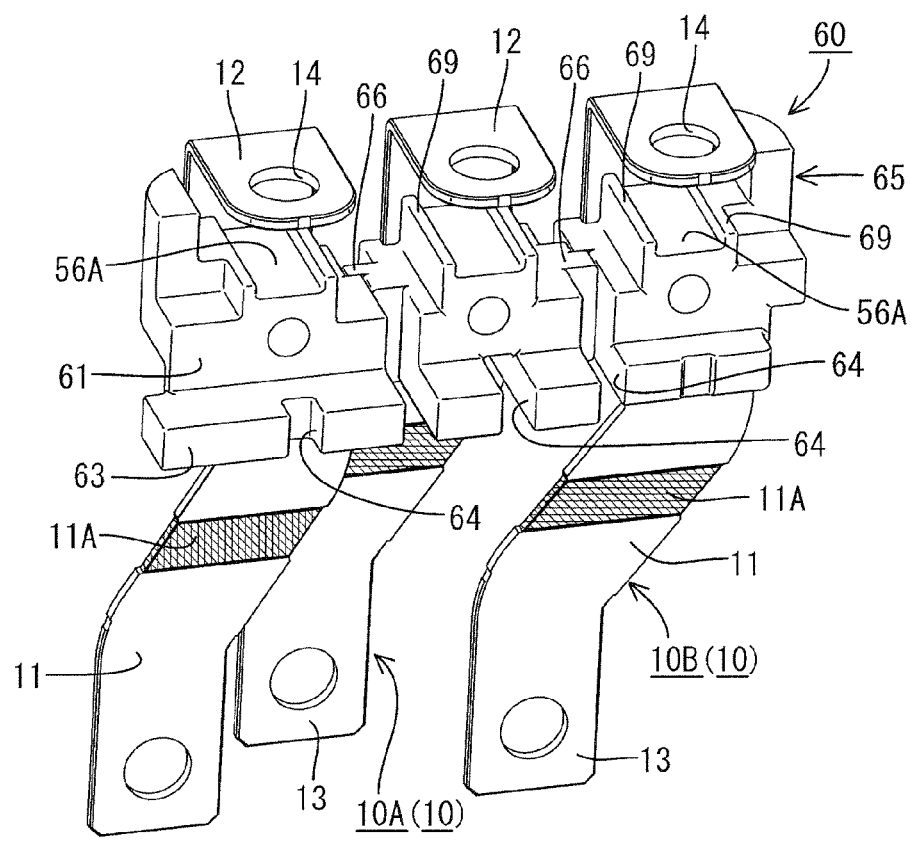
FIG. 8 is a perspective view showing a state where three cores are arranged in contact.
Figure 9:
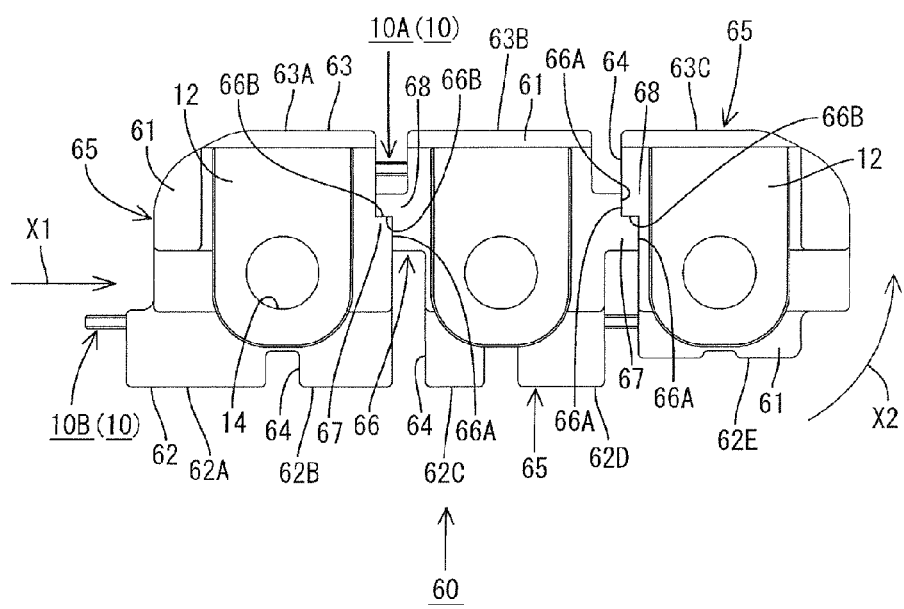
FIG. 9 is a plan view showing the state where the three cores are arranged in contact.

A primary molded article 60 formed by primary molding comprises the conductive plates 10 and the primary molded portion 61 made of synthetic resin and covering parts of the terminal main portions 11 of the conductive plates 10 to define a unitary matrix or synthetic resin surrounding portions of the conductive plates 10. As shown in FIGS. 8 and 9, the conductive plates 10 are held in the primary molded portion 61 while being arranged at equal intervals in the lateral direction.

As shown in FIG. 8, the primary molded portion 61 is roughly in the form of a substantially rectangular block longer in the lateral direction LD when viewed from above, and covers vertical central parts of the terminal main portions 11 of the respective conductive plates 10 over substantially the entire peripheries. The terminal main portion 11 of the conductive plate 10A in the center position is covered while vertically penetrating through a rear part of the primary molded portion 61, and the terminal main portions 11 of the conductive plates 10B located at the left and right sides are covered in the rear part of the primary molded portion 61 and the folding portions 15 thereof are covered in a lower part of the primary molded portion 61, as shown in FIG. 11. In other words, as shown in FIGS. 1 and 11, the primary molded portion 61 covers cranked parts of the terminal main portions 11 of the respective conductive plates 10, and these covered parts are subject to an injection pressure of molding resin injected from the lateral side. Sealing portions 11A where an adhesive is to be applied are provided below the parts of the terminal main portions 11 of the respective conductive plates 10 covered by the primary molded portion 61 and adhere to the secondary molded portion 70 to prevent the entry of water or the like into the housing 50 when the secondary molded portion 70 is formed.

Figure 10:
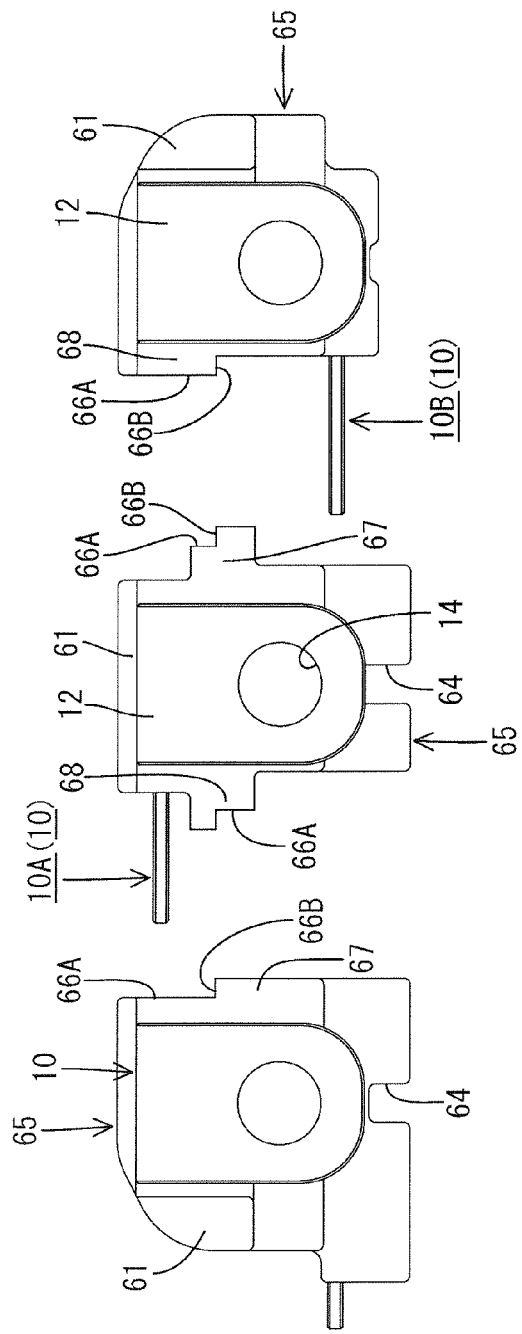
FIG. 10 is a plan view showing a state where the three cores are arranged while being spaced apart.

Resin entering spaces 64 are formed in a front end surface 62 and a rear end surface 63 of the primary molded portion 61 and extend substantially straight in forward and backward directions FBD (directions crossing the lateral direction LD and an arrangement direction AD of the conductive plates 10) as shown in FIGS. 9 and 10. The resin entering spaces 64 can receive molding resin when the secondary molded portion 70 is formed. Each resin entering spaces 64 has a substantially rectangular plan view and is formed between the adjacent conductive plates 10 in the primary molded portion 61, in a part aligned with the left conductive plate 10B in the primary molded portion 61 and in a part aligned with the center conductive plate 10A in the front surface of the primary molded portion 61. Further, the resin entering spaces 64 between the adjacent conductive plates 10 are longer in forward and backward directions FBD than the resin entering spaces 64 aligned with the conductive plates 10. The resin entering spaces 64 between the adjacent conductive plates 10 are formed so that contact portions 66 remain at substantially central parts of the primary molded portion 61 in forward and backward directions FBD and at the back ends of the resin entering spaces 64. Thus, a straight part of the front end surface 62 of the primary molded article 60 extending in the lateral direction LD is divided by the resin entering spaces 64, as shown in FIG. 9. As a result, the front end surface 62 has straight parts 62A, 62B, 62C, 62D and 62E substantially extending in the lateral direction LD one after another. The lengths of the respective straight parts 62A, 62B, 62C, 62D and 62E extending in the lateral direction LD one after another are shorter than the length of the straight part continuously extending in the lateral direction LD when the front end surface 62 of the primary molded article 60 is not divided by the resin entering spaces 64.

The rear end surface 63 of the primary molded article 60 also is divided in the lateral direction LD by the resin entering spaces 64. As a result, the rear end surface 63 is composed of substantially straight parts 63A, 63B and 63C extending in the lateral direction LD one after another. The lengths of the respective straight parts 63A, 63B and 63C extending in the lateral direction LD one after another are shorter than the length of the substantially straight part continuously substantially extending in the lateral direction LD when the rear end surface 63 of the primary molded article 60 is not divided by the resin entering spaces 64.

As shown in FIG. 9, three cores 65, 65, 65 particularly are in contact in the lateral direction LD in the primary molded article 60. The respective cores 65, 65, 65 are divided at the resin entering spaces 64 between the adjacent conductive plates 10, 10, and the adjacent cores 65, 65 are connected in the lateral direction LD by the contact portion 66 formed at the back ends of the resin entering spaces 64. Thus, the adjacent cores 65, 65 are in contact in the lateral direction LD via the contact portion 66

The contact portion 66 comprises a first link 67 extending laterally to the right from the primary molded portion 61 of the core 65 on the left side and a second link 68 extending laterally to the left from the primary molded portion 61 of the core 65 located on the right side.

Each link 67, 68 is at an angle, preferably substantially perpendicular, to an injection direction (lateral direction LD) and includes two first surfaces 66A displaced in the lateral direction LD and a second surface 66B located between the two first surfaces 66A, 66A and substantially perpendicular to the first surfaces 66A. The two first surfaces 66A, 66A and the second surface 66B are connected in a cranked manner. The two first surfaces 66A, 66A of the link 67 and the two first surfaces 66A, 66A of the link 68 are in surface contact in the injection direction, and the second surface 66B of the link 67 and the second surface 66B of the link 68 are in surface contact in a direction at an angle, preferably substantially perpendicular to the injection direction. That is, parts of the respective links 67, 68 held in surface contact with each other form a cranked shape obtained by connecting the two first surfaces 66A and the second surface 66B, as shown in FIG. 9, and the adjacent cores 65, 65 are held in surface contact with each other in forward and backward directions FBD and lateral direction LD.

Two tight holding portions 69, 69 project up on the top of each core 65 and face each other in the lateral direction LD, as shown in FIG. 8. The tight holding portions 69 extend in forward and backward directions FBD, and tightly hold the slide die 92 from opposite sides when forming the nut accommodating portions 55 and the escaping recesses 56 of the housing 50 during secondary molding. A bottom wall 56A extends between the lower ends of the tight holding portions 69, 69 in each pair. A length from the bottom walls 56A to the wire-side fastening portions 12 above the nut accommodating portions 55 is set to be substantially equal to a length that is the sum of the heights of the nut accommodating portions 55 and the escaping recesses 56 in the housing 50, and the wire-side fastening portions 12 and the bottom walls 56A tightly hold the slide die 220 from upper and lower sides when secondary molding is performed.

The secondary molded portion 70 formed by secondary molding is such that the primary molded portion 61 of the primary molded article 60 penetrates through the opening 31 of the metal plate 30 in forward and backward directions FBD as shown in FIGS. 5 and 6, and the secondary molded portion 70 forms part of the housing 50 together with the primary molded portion 61. At the time of secondary molding, molten molding resin to be molded into the secondary molded portion 70 enters the resin entering spaces 64 of the primary molded article 60 and flows to both upper and lower surfaces of the metal plate 30. Thus, the primary molded article 60 and the metal plate 30 are formed integrally. Voids in the thick portion 57 of the connector housing 50 are suppressed or reduced by arranging the primary molded portion 61 of the primary molded article 60 in the thick portion 57 of the housing 50 and forming the thick portion 57, which is thickest in the housing 50, in the primary molded portion 61 and the secondary molded portion 70. This can prevent crack formation in the thick portion 57 due to voids and a reduction in the waterproof property of the terminal block. Further, since the primary molded article 60 is formed as three separate parts for the respective conductive plates 10, the formation of voids in the primary molded portion 61 can be further suppressed.

The respective cores 65, 65, 65 are set one next to another in the lateral direction LD in a lower die 210 of upper and lower dies 200, 210 that are opened in the vertical direction VD for secondary molding, while being held in surface contact at the respective contact portions 66. The adjacent cores 65, 65 can be set in the lower die 210 only by bringing the respective cranked links 67, 68 into surface contact in forward and backward directions FBD and lateral direction LD. Thus, a process of setting the cores 65 in the lower die 210 can be simplified as compared with the case where the links are engaged with each other by mating engagement. Further, a die for forming the primary molded portion 61 can be simplified and production cost of the die for primary molding can be reduced as compared with the case where the respective links 67, 68 are formed as projections and recesses.

Figure 12:
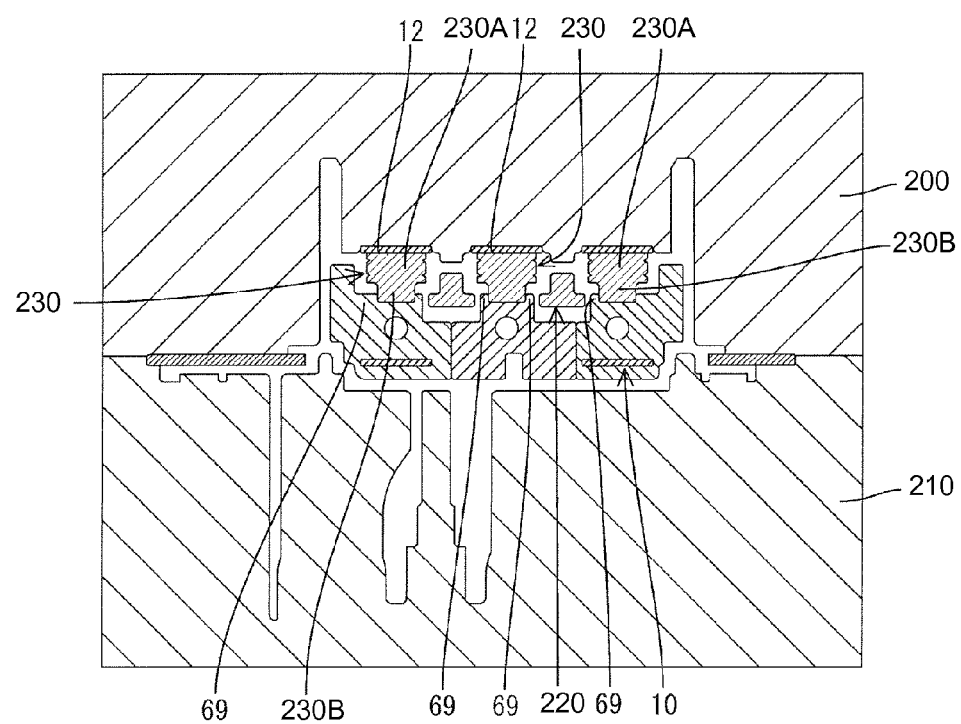
FIG. 12 is a section showing a state where the cores are held by upper and lower dies and a slide die.
Figure 13:
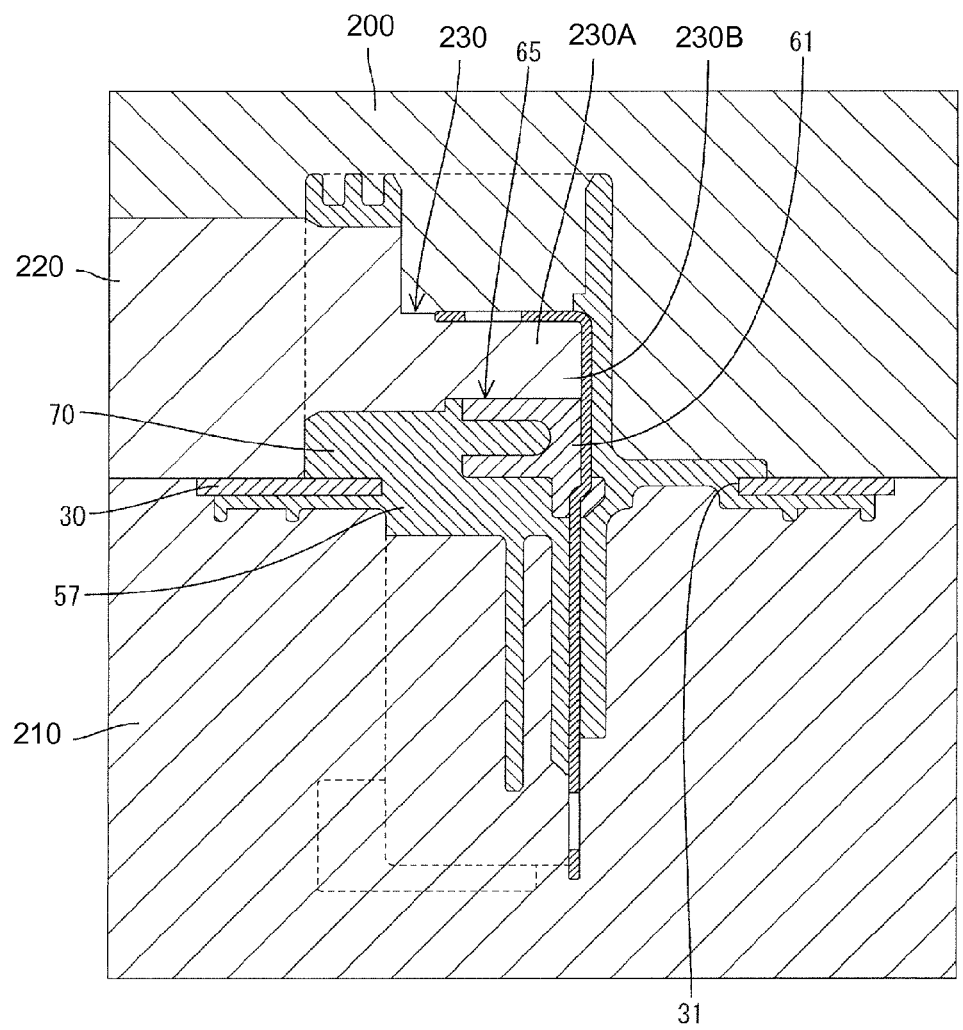
FIG. 13 is a section showing a state where a secondary molded portion is formed in the upper and lower dies and the slide die.

When all of the cores 65 are set in the lower die 210, the slide die 220 is inserted from front into spaces substantially enclosed by the pairs of tight holding portions 69, 69 of the respective cores 65, 65, 65, the wire-side fastening portions 12 and the bottom walls 56A. The die then is clamped so that the upper and lower dies 200, 210 sandwich all of the cores 65 from the upper and lower sides, as shown in FIG. 13. At this time, the slide die 220 is assembled to be held tightly from the left and right sides by the pairs of tight holding portions 69, 69 and from the upper and lower sides by the wire-side fastening portions 12 and the bottom walls 56A. Specifically, as shown in FIGS. 12 and 13, the slide die 210 includes three molding pins 230 each comprising a nut accommodating portion forming portion 230A and an escaping recess forming portion 230B narrower than the nut accommodating portion forming portion 230A in the lateral direction LD. The escaping recess forming portions 230B are held tightly from the left and right sides by the pairs of the tight holding portions 69, 69 of the primary molded portion 61.

Subsequently, the secondary molded portion 70 is formed by injecting molten molding resin, for example, from the back side to the front side of the plane of FIG. 13 from an unillustrated gate provided at a lateral side of the upper and lower dies 200, 210, thereby forming the connector housing 50 as shown in FIG. 13. At this time, the molding resin is received by the left surface of the primary molded portion 61 in the respective cores 65, 65, 65, and the respective cores 65, 65, 65 try to move in an injection direction X1 of the molding resin and in a counterclockwise rotational direction X2 about the centers of the axis lines of the conductive plates 10, as shown in FIG. 9. However, the respective cores 65, 65, 65 are connected in surface contact with each other by the contact portions 66 (first surfaces 66A). Thus, all of the cores 65 become integral, thereby resisting the injection pressure of the molding resin and suppressing displacements of the respective cores 65, 65, 65 in the injection direction. Further, the contact portions 66 (second surfaces 66B) come into surface contact in forward and backward directions FBD, thereby restricting clockwise rotational forces about the axis centers of the conductive plates 10 and suppress displacements of the respective cores 65, 65, 65.

The respective cores 65, 65, 65 tightly hold the slide die 92 in vertical and lateral directions using the pairs of tight holding portions 69, 69, the wire-side fastening portions 12 and the bottom walls 56A. Thus, displacements of the cores 65, 65, 65 in the injection direction are suppressed further and vertical displacements thereof also are suppressed. Displacements of the conductive plates 10 resulting from displacements of the cores 65, 65, 65 also are suppressed. Note that the pairs of the tight holding portions 69, 69 of the respective cores 65, 65, 65 in the primary molded portion 61 form pairs of inner walls 56B, 56B facing each other in the escaping recesses 56 of the housing 50 together with the secondary molded portion 70, as shown in FIG. 6.

The secondary molded portion 70 formed as described above is cured by being cooled, and together with the primary molded portion 61 forms the housing 50. In this cooling process, the secondary molded portion 70 is cured and shrinks and could squash part of the primary molded portion 61 covered thereby. However, in this embodiment, the straight parts of the front and rear end surfaces 62, 63 of the primary molded portion 61 are divided by the resin entering spaces 64, and the lengths of the parts of the secondary molded portion 70 individually covering the respective straight parts 62A, 62B, 62C, 62D, 62E, 63A, 63B and 63C of the respective cores 65 are short. Thus, as compared with the case where the primary molded portion is formed with no resin entering spaces 64, the amount of shrinkage of the secondary molded portion 70 individually covering the respective straight parts 62A, 62B, 62C, 62D, 62E, 63A, 63B and 63C of the respective cores 65, 65, 65 is smaller. In this way, the squashing of the primary molded portion 61 by the secondary molded portion 70 can be suppressed. Further, the resin entering spaces 64 extend in forward and backward directions FBD and are larger between the adjacent cores 65, 65 than in the other parts. Thus, it is possible to further effectively divide the primary molded portion 61 and further suppress the influence of cure shrinkage in the secondary molded portion 70.

Further, since the escaping recess forming portions 93B of the slide die 92 particularly are tightly held by the pairs of tightly holding portions 69, 69 upon forming the secondary molded portion 70 in this embodiment, the width of the primary molded portion 61 in the lateral direction LD can be shortened and the thickening of the primary molded portion 61 in the lateral direction LD can be suppressed as compared with the case where pairs of tightly holding portions for tightly holding the nut accommodating portion forming portions 230A for forming the nut accommodating portions 55 are provided. This can further suppress the formation of voids in the primary molded portion 61.

Figure 14:
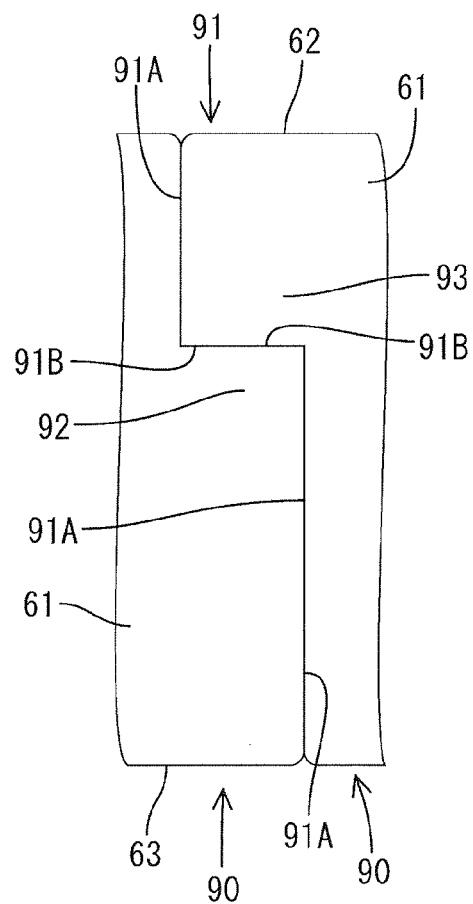
FIG. 14 is a plan view of a contact portion according to a first modification when viewed from above.

A first modification of the contact portion 66 in the above embodiment is described with reference to FIG. 14. In the first modification, the shapes of the first link 67 and the second link 68 of the contact portion 66 in the above embodiment are changed. The constructions, functions and effects common or similar to the above embodiment are not described to avoid repeated description. Further, the similar or same constructions as in the above embodiment are identified by the same reference numerals.

The resin entering spaces 64 are not formed between adjacent cores 90', 90' in the first modification, and part or all first surfaces 91'A of a first link 92' and a second link 93' of a contact portion 91' extend up to the front and rear end surfaces 62, 63 of the primary molded portion 61. Accordingly, as compared with the case where the lengths of the first surfaces 91'A in forward and backward directions FBD are short, the area of the adjacent cores 90', 90' held in contact in the lateral direction LD can be increased, and all the cores 90' can be made integral by connecting the adjacent cores 90' over a larger area. This can more suppress displacements of the respective cores 90' in the injection direction of the molding resin.

Figure 15:
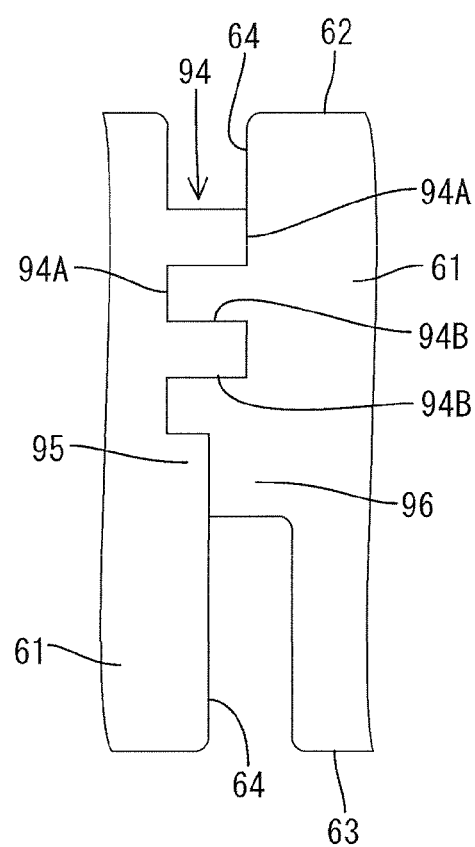
FIG. 15 is a plan view of a contact portion according to a second modification when viewed from above.

A second modification of the contact portion 66 in the above embodiment is described with reference to FIG. 15. In the second modification, the shapes of the first and second links 67 and 68 of the contact portion 66 in the above embodiment are changed. The constructions, functions and effects common or similar to the above embodiment are not described to avoid repeated description. Further, the similar or same constructions as in the above embodiment are identified by the same reference numerals.

Parts of a first and second links 95 and 96 of a contact portion 94 in the second modification that substantially come into surface contact with each other are in the shape of saw blades, and each includes plural first surfaces 94A displaced in the lateral direction LD and plural second surfaces 94B connecting between the first surfaces 94A. The first and second links 95 and 96 are connected by mating engagement, which can suppress displacements of the respective cores 65, 65, 65 in the injection direction of the molding resin and also in clockwise and counterclockwise rotational directions resulting from the injection pressure of the molding resin.

Figure 16:
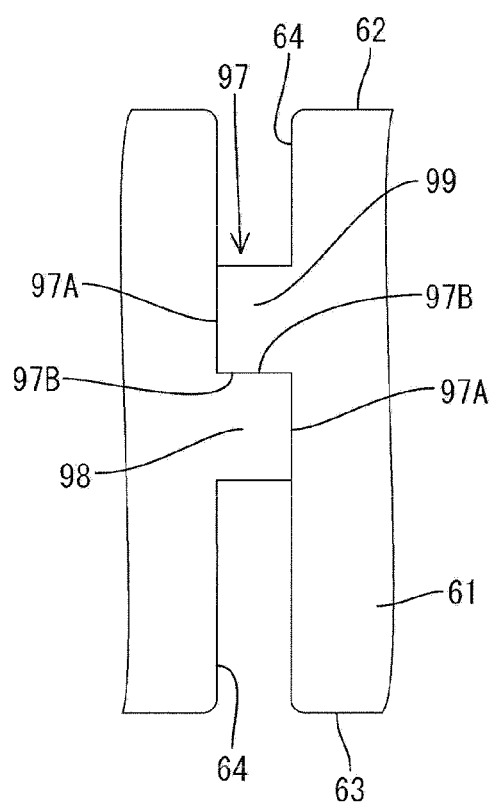
FIG. 16 is a plan view of a contact portion according to a third modification when viewed from above.

A third modification of the contact portion 66 in the above embodiment is described with reference to FIG. 16. In the third modification, the shapes of the first and second links 67 and 68 of the contact portion 66 in the above embodiment are changed. The constructions, functions and effects common or similar to the above embodiment are not described to avoid repeated description. Further, the similar or same constructions as in the above embodiment are identified by the same reference numerals.

Parts of a first and second links 98 and 99 of a contact portion 97 in the third modification that substantially come into surface contact with each other substantially are in the form of projections each defined by a first surface 97A substantially perpendicular or angularly aligned to the injection direction of the molding resin and second surfaces 97B perpendicular to the first surface 97A. The first and second links 98, 99 form the contact portion 97 by bringing the projecting parts thereof into surface contact to form a cranked shape in forward and backward directions FBD and lateral direction LD, and the adjacent cores 65, 65 can be held in contact via the contact portion 97 so that the respective cores 65, 65, 65 are not displaced in the injection direction and clockwise direction by the injection pressure of the molding resin. Further, similar to the above embodiment, the cores 65 can be set merely by bringing the first and second links 98, 99 into contact in forward and backward directions FBD and/or lateral direction LD when the respective cores 65, 65, 65 are set in the lower die 91 for secondary molding. Therefore an assembling process can be simplified.

Figure 17:
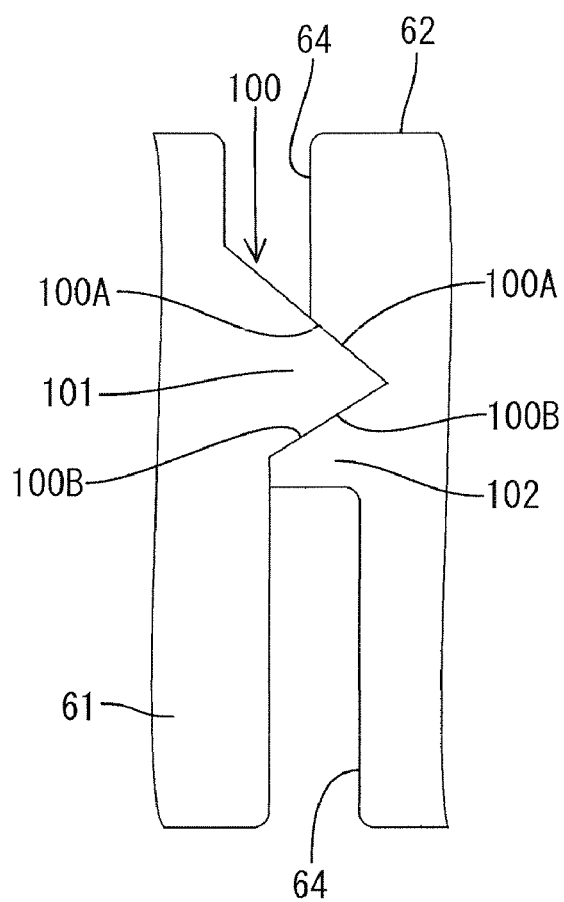
FIG. 17 is a plan view of a contact portion according to a fourth modification when viewed from above.

A fourth modification of the contact portion 66 in the above embodiment is described with reference to FIG. 17. In the fourth modification, the shapes of the first and second links 67 and 68 of the contact portion 66 in the above embodiment are changed. The constructions, functions and effects common or similar to the above embodiment are not described to avoid repeated description. Further, the similar or same constructions as in the above embodiment are identified by the same reference numerals.

Parts of first and/or second links 101 and 102 of a contact portion 100 in the fourth modification that substantially come into surface contact with each other include each a first surface 100A inclined (e.g. down to the right) to intersect with the injection direction of the molding resin and a second surface 100B intersecting the first surface 100A and inclined (e.g. up to the right) to intersect with the injection direction. The first link 101 is a substantially triangular projection, and the second link 102 is a substantially triangular recess. The first and second links 101, 102 come into surface contact with each other in an oblique direction by mating engagement, which can suppress displacements of the respective cores 65, 65, 65 not only in the injection direction of the molding resin, but also in both clockwise and counterclockwise rotational directions resulting from the injection pressure of the molding resin.

The present invention is not limited to the above described embodiment. For example, the following embodiments also are included in the scope of the invention.

Although the adjacent cores 65, 65 are held in contact by one contact portion in the above embodiment, the present invention is not limited to such a mode. For example, the adjacent cores may be held in contact by a plurality of contact portions.

Although the terminal block includes the shielding shell 80 in the above embodiment, the present invention is not limited to such a mode. For example, the present invention may be applied to a terminal block which requires no shielding shell.

Although the connector housing 50 is formed with the primary molded portion 61 penetrating through the opening 31 of the metal plate 30 in the above embodiment, the present invention is not limited to such a mode. For example, the primary molded portion 61 may not penetrate through the opening 31 of the metal plate 30.

What is claimed is:

1. A device connector for connection to device-side terminals in a device, comprising:
    at least first and second cores each of which has a conductor and a primary molded portion defining an integral matrix of resin surrounding and supporting part of the respective conductor, a contact portion formed by at least two intersecting surfaces of the primary molded portion of the first core that are in face to face contact with two intersecting surfaces of the primary molded portion of the second core;
    a metal plate to be attached and fixed to the device; and
    a secondary molded portion defining an integral matrix of resin surrounding and supporting parts of the metal plate and parts of the conductors of the first and second cores, the secondary molded portion further engaging surfaces of the primary molded portions substantially opposite the surfaces of the contact portion that are in face to face contact for holding the first and second cores in contact in two or more intersecting directions including an injection direction of molding resin.

2. A device connector for connection to device-side terminals in a device, comprising:
    a plurality of cores each of which has a conductor and a primary molded portion defining an integral matrix of resin surrounding and supporting part of the respective conductor;
    a metal plate to be attached and fixed to the device; and
    a secondary molded portion defining an integral matrix of resin surrounding and supporting parts of the metal plate and the cores and holding cores in contact and substantially side by side, wherein a contact portion is provided between a pair of adjacent cores and the pair of adjacent cores are held in contact via the contact portion in two or more directions including an injection direction of molding resin, wherein parts of the contact portion that come into contact with each other are formed by a first intersecting surface intersecting the injection direction and a second intersecting surface extending in the injection direction.

3. The device connector of claim 2, wherein the first intersecting surfaces of the pair of adjacent cores substantially come into surface contact with each other and the second intersecting surfaces thereof substantially come into surface contact with each other when the molding resin for forming the secondary molded portion is injected into a secondary molding die.

4. The device connector of claim 2, wherein the parts of the contact portion that come into contact with each other are each formed into a cranked shape by connecting the first intersecting surface and the second intersecting surface.

5. The device connector of claim 2, wherein the contact portion is formed between the pair of adjacent cores while a resin entering space into which the molding resin for forming the secondary molded portion can at least partly enter is formed therebetween.

6. The device connector of claim 2, wherein at least one resin entering space into which molding resin for forming the secondary molded portion can enter, is arranged to cross a straight part of the primary molded portion extending in an arrangement direction of the conductors in the primary molded portion before the secondary molded portion is formed.

7. The device connector of claim 6, wherein the resin entering space is at least partly formed between a pair of adjacent conductors.

* * * * *